United States Patent
Zuardy et al.

(10) Patent No.: US 9,494,185 B2
(45) Date of Patent: Nov. 15, 2016

(54) SUPPORT STRUT FOR SUPPORTING PRIMARY COMPONENTS AS WELL AS GUIDING SYSTEMS WITH SUCH A SUPPORT STRUT AND METHOD FOR MANUFACTURING SUCH A SUPPORT STRUT

(71) Applicant: Airbus Operations GmbH, Hamburg (DE)

(72) Inventors: M. Ichwan Zuardy, Hamburg (DE); Claus Fastert, Drochtersen (DE); (Continued)

(73) Assignee: Airbus Operations GmbH, Hamburg (DE)

( * ) Notice: Subject to any disclaimer, the term of this patent is extended or adjusted under 35 U.S.C. 154(b) by 209 days.

(21) Appl. No.: 13/923,572

(22) Filed: Jun. 21, 2013

(65) Prior Publication Data
US 2014/0014771 A1    Jan. 16, 2014

Related U.S. Application Data

(63) Continuation of application No. PCT/EP2012/000082, filed on Jan. 10, 2012.
(Continued)

(30) Foreign Application Priority Data

Jan. 10, 2011    (DE) ................ 10 2011 008 215

(51) Int. Cl.
*F16C 11/04*    (2006.01)
*B29C 70/46*    (2006.01)
(Continued)

(52) U.S. Cl.
CPC ............... *F16C 11/04* (2013.01); *B29C 43/18* (2013.01); *B29C 70/462* (2013.01); *B29C 70/86* (2013.01);
(Continued)

(58) Field of Classification Search
CPC ............. F16C 11/04; F16C 7/02; B64C 13/28; B64C 1/06; B29C 43/18; B29C 70/86;
(Continued)

(56) References Cited

U.S. PATENT DOCUMENTS 8,667,754 B2    3/2014  Schalla et al.

FOREIGN PATENT DOCUMENTS

WO    WO 2006/131344    12/2006

OTHER PUBLICATIONS

German Office Action for Application No. 10 2011 008 215.8 dated Mar. 5, 2014.
(Continued)

*Primary Examiner* — Christopher P Ellis
*Assistant Examiner* — Jessica Wong
(74) *Attorney, Agent, or Firm* — Jenkins, Wilson, Taylor & Hunt, P.A.

(57) ABSTRACT

A support strut for use as a primary load-bearing structural component for the hinged coupling of at least one additional primary load-bearing structural component. The support strut includes: a rod-shaped base body extending in a longitudinal direction, a fiber composite with an annular cross section, central hole originating from the first end of the base body, and with annular holes spaced apart relative to each other in the circumferential direction of the annular cross section and originating from the first end of the base body as well as running along the longitudinal direction in the base body; roving bundles imbedded in a matrix material that fills up the respective annular hole; and a hinged
(Continued)

connecting body with a bearing receptacle for holding a swivel joint; as well as a guiding system with such a support strut and a method for manufacturing such a support strut.

6 Claims, 7 Drawing Sheets

(72) Inventors: Holger Purol, Selsingen (DE); Pierre Zahlen, Stade (DE); York Caesar Roth, Stade (DE)

Related U.S. Application Data (60) Provisional application No. 61/431,223, filed on Jan. 10, 2011.

(51) Int. Cl.
  *B29C 70/86* (2006.01)
  *B64C 1/06* (2006.01)
  *B29C 43/18* (2006.01)
  *B64C 13/28* (2006.01)
  *F16C 7/02* (2006.01)
  *B29L 31/00* (2006.01)

(52) U.S. Cl.
  CPC ............... *B64C 1/06* (2013.01); *B64C 13/28* (2013.01); *F16C 7/02* (2013.01); *B29L 2031/75* (2013.01); *Y02T 50/433* (2013.01); *Y10T 16/558* (2015.01)

(58) Field of Classification Search
  CPC ............... B29C 70/462; Y10T 16/558; B29L 2031/75; Y02T 50/433
  USPC ............. 244/99.3; 16/387; 264/242; 428/99; 57/362
  See application file for complete search history.

(56) References Cited

OTHER PUBLICATIONS

European Office Action for Application No. 12 700 777.1 dated Nov. 5, 2015.

SUPPORT STRUT FOR SUPPORTING PRIMARY COMPONENTS AS WELL AS GUIDING SYSTEMS WITH SUCH A SUPPORT STRUT AND METHOD FOR MANUFACTURING SUCH A SUPPORT STRUT

CROSS-REFERENCE TO RELATED APPLICATIONS

This application is a continuation of PCT application serial No. PCT/EP2012/000082 filed Jan. 10, 2012, which claims the benefit of and priority to German patent application serial No. DE 10 2011 008 215.8 filed Jan. 10, 2011 and to U.S. provisional application Ser. No. 61/431,223 filed Jan. 10, 2011, the disclosures of which applications are hereby incorporated herein by reference.

TECHNICAL FIELD

The invention relates to a support strut for supporting primary components as well as guiding systems with such a support strut and a method for manufacturing such a support strut.

BACKGROUND

Known from WO06131344 is a rod-shaped fiber composite that is basically suitable for absorbing torsion and bending loads.

SUMMARY

The object of the invention is to provide a support strut for supporting primary components that is especially suitable for installation in aircraft structures.

This object is achieved with the features in the independent claims. Additional embodiments are indicated in the subclaims referring back thereto.

The invention provides a support strut for use as the primary load-bearing structural component for the hinged coupling of at least one additional primary load-bearing structural component, wherein the support strut exhibits:

A rod-shaped base body extending in a longitudinal direction and consisting of a fiber composite, with an end section lying at a first end of the base body and at least sectionally exhibiting an annular cross section along the longitudinal direction, which defines a central hole originating from the first end of the base body, and with annular holes spaced apart relative to each other in the circumferential direction of the annular cross section and originating from the first end of the base body as well as running along the longitudinal direction in the base body, Roving bundles, of which at least one lies in a respective one of a plurality of annular holes, and is imbedded in a matrix material that fills up the respective annular hole, A hinged connecting body inserted into the cylindrical central hole of the base body at the first end and/or at the second end, with a primary body and an attachment piece connected thereto with a bearing receptacle for holding a swivel joint;

wherein the diameter of the inside wall of the central hole diminishes particularly in the end section toward the first end in such a way that the base body positively prevents the cylindrical primary body from moving out of the first end of the base body in its longitudinal direction.

This embodiment of the support strut can provide

That a second end lying opposite the first end also exhibits a central hole and several annular holes spaced apart relative to each other in the circumferential direction of the annular cross section and originating from the second end of the base body as well as running along the longitudinal direction in the base body, Roving bundles, of which at least one lies in a respective one of a plurality of annular holes formed at the second end, and is imbedded in a matrix material that fills up the respective annular hole, That a hinged connecting body be inserted into the cylindrical central hole, exhibiting: a primary body and an attachment piece connected thereto with a bearing receptacle for holding a swivel joint, wherein the diameter of the inside wall of the central through opening diminishes particularly in the end section toward the second end in such a way that the base body prevents the cylindrical primary body from moving out of the second end of the base body in its longitudinal direction.

Especially for reasons relating to production technology, the base body in this embodiment is preferably made out of duroplastic material, and reinforced with fibers comprised of a fiber material, in particular glass fibers, which has a relatively lower quality by comparison to the fiber material of the primary load-bearing roving bundles. Due to damage tolerance considerations, the roving bundles preferably consist of carbon fiber-reinforced thermoplastic material. In this way, the roving bundles can absorb primary loads of the support strut in the event of damage, e.g., a tear or break in the shell portion of the base body, which renders the shell portion completely or partially unable to absorb any more primary loads.

This embodiment of the support strut according to the invention can provide in particular that the base body be comprised in particular of a matrix material consisting of a duroplastic material, and/or that the fiber constituents of the base body be comprised in particular of carbon fibers and/or glass fibers.

This embodiment of the support strut according to the invention can further provide that the base body be comprised of a matrix material consisting of a thermoplastic material and/or that the fiber constituents of the base body be comprised of carbon fibers and/or glass fibers.

Further, the roving bundles can be comprised of a carbon fiber-reinforced thermoplastic material or duroplastic material.

In this embodiment of the support strut, the central hole can be designed as a central through opening that extends in the longitudinal direction through the base body.

The annular holes can each be designed as an annular through opening, which extends in the longitudinal direction through the base body.

Another aspect of the invention provides an additional embodiment of the support strut for use as a primary load-bearing structural component for the hinged coupling of at least one additional primary load-bearing structural component, wherein the support strut exhibits:

A rod-shaped base body extending in a longitudinal direction and consisting of a fiber composite, with an end section lying at a first end of the base body and at least sectionally exhibiting an annular cross section along the longitudinal direction, which defines a central hole originating from the first end of the base body, and with annular holes spaced apart relative to each other in the circumferential direction of the annular cross section and originating from the first end of the base body as well as running along the longitudinal direction in the base body, Roving bundles, of which at least one lies in a respective one of a plurality of annular holes, and is imbedded in a matrix material that fills up the respective annular hole, A connecting part that is arranged at the first end of the base body and held at a predetermined distance from the base body by way of a roving bundle, which is imbedded in a matrix material, and whose ends lie in annular holes.

In particular, several roving bundles are here arranged in such a way that their respective end sections lie in a respective one of two annular holes, and that the intermediate section lying between the respective end sections extends out of the respective annular holes over a surface of the connecting part, which lies on the other side of the base body of the hinged strut, and wherein the intermediate section of the respective roving bundle is imbedded in a matrix material, so that the intermediate sections of the roving bundles of the support strut in conjunction with the matrix material enveloping the latter form a connecting piece that holds the connecting part on the base body.

This embodiment of the support strut according to the invention can provide that A cylindrical central hole and several annular holes spaced apart from each other in the circumferential direction of the annular cross section and originating from the second end of the base body as well as running along the longitudinal direction in the base body are also formed on a second end lying opposite the first end, Roving bundles lie in annular holes formed at the second end, of which at least one lies in a respective one of a plurality of annular holes formed at the second end, and is imbedded in a matrix material that fills up the respective annular hole, A connecting part that is arranged at the second end of the base body and held at a predetermined distance from the base body by way of a roving bundle, which is imbedded in a matrix material, and whose ends lie in annular holes.

In particular, several roving bundles can also be arranged at the second end in such a way that their respective end sections lie in a respective one of two annular holes, and that the intermediate section lying between the respective end sections extends out of the respective annular holes over a surface of the hinged connecting body, which lies on the other side of the base body of the hinged strut, and wherein the intermediate section of the respective roving bundle is imbedded in a matrix material, so that the intermediate sections of the roving bundles of a hinged strut in conjunction with the matrix material enveloping the latter form a connecting piece that holds the hinged connecting body on the base body.

This embodiment of the support strut according to the invention can provide that the at least one roving bundle extending over a surface of the hinged connecting body consists of a carbon fiber-reinforced thermoplastic material or duroplastic material.

This embodiment of the support strut according to the invention can further provide that the base body be comprised of a matrix material consisting of a duroplastic material or thermoplastic material, and in the reinforcing fibers in particular of glass fibers. Especially for reasons relating to production technology, the base body in this embodiment is preferably made out of duroplastic material, and reinforced with fibers comprised of a fiber material, in particular glass fibers, which has a relatively lower quality by comparison to the fiber material of the primary load-bearing roving bundles. Due to damage tolerance considerations, the roving bundles preferably consist of carbon fiber-reinforced thermoplastic material. In this way, the roving bundles can absorb primary loads of the support strut in the event of damage, e.g., a tear or break in the shell portion of the base body, which renders the portion completely or partially unable to absorb any more primary loads.

Further, the connecting part can be formed with a matrix material comprised of duroplastic.

Another aspect of the invention provides an additional embodiment of the support strut for use as a primary load-bearing structural component for the hinged coupling of at least one additional primary load-bearing structural component, in which the support strut in particular exhibits A rod-shaped base body extending in a longitudinal direction and consisting of a fiber composite, with an end section lying at a first end of the base body and at least sectionally exhibiting an annular cross section along the longitudinal direction, which defines a central hole originating from the first end of the base body, and with annular holes spaced apart relative to each other in the circumferential direction of the annular cross section and originating from the first end of the base body as well as running along the longitudinal direction in the base body, Roving bundles, of which at least one lies in a respective one of a plurality of annular holes, and is imbedded in a matrix material that fills up the respective annular hole, An attachment piece formed on an end section of the first end of the base body, which is configured in particular for attaching the support strut to a load-bearing structural component, wherein the end section is made by compressing the cross section in the region of the end section.

This embodiment of the support strut according to the invention can further provide that the base body be comprised of a matrix material consisting of a thermoplastic material and/or that the fiber constituents of the base body be comprised in particular of carbon fibers and/or glass fibers. Especially for reasons relating to production technology, the base body in this embodiment is preferably made out of duroplastic material, and reinforced with fibers comprised of a fiber material, in particular glass fibers, which has a relatively lower quality by comparison to the fiber material of the primary load-bearing roving bundles. Due to damage tolerance considerations, the roving bundles preferably consist of carbon fiber-reinforced thermoplastic material. In this way, the roving bundles can absorb primary loads of the support strut in the event of damage, e.g., a tear or break in the shell portion of the base body, which renders the shell portion completely or partially unable to absorb any more primary loads.

Further, the roving bundles can be comprised of a carbon fiber-reinforced thermoplastic material or duroplastic material.

In another aspect of the invention, a guiding mechanism of a regulating flap system in an aircraft is provided with at least one regulating flap, a regulating device for adjusting the regulating flap and a supporting device for holding the regulating flap when executing the setting movement of the regulating flap, characterized in that the supporting device exhibits at least one support strut, which is designed based on one of the embodiments according to the invention.

In particular, the guiding mechanism can be a high-lift system. The high-lift system can here exhibit a track mechanism or a dropped-hinge mechanism.

Another aspect of the invention provides a method for manufacturing a support strut, wherein an attachment piece for accommodating a hinged joint is inserted in an end section of the support strut composed of a thermoplastic material, and wherein the attachment piece exhibits a section with a cross sectional tapering. In order to secure the attachment piece in the base body of the support strut, an outer end section of the base body is here molded in such a way that the diameter of the inside wall of the central hole diminishes toward the first end and at the cross sectional tapering section of the attachment piece, so that the base body positively prevents the cylindrical main body from moving out of the first end of the base body in its longitudinal direction.

Another aspect of the invention provides a method for manufacturing a support strut, wherein an end section of the support strut is designed as an attachment piece for accommodating a hinged joint. The attachment piece is here formed by compressing an outer end section of the base body of the support strut.

BRIEF DESCRIPTION OF THE DRAWINGS

Exemplary embodiments of the invention will be described below based on the attached figures. Shown on:

FIG. 3 is a perspective view of a section of an embodiment of the support strut according to the invention with a base body and hinged connecting body, wherein FIG. 3 depicts the section of the latter lying at a first end of the support strut, and wherein the base body is shown in a state during the manufacture of the support strut before its shape is adjusted to the shape of the hinged connecting body, FIG. 4 is a perspective view of the embodiment of the support strut according to the invention depicted on FIG. 3 in the assembled state, in which the shape of the base body has been adjusted to the shape of the hinged connecting body, wherein FIG. 4 shows the section of the latter lying at a first end of the support strut, FIG. 5 is a perspective sectional view of the embodiment of the support strut according to the invention depicted on FIG. 3, wherein the section runs along the longitudinal direction of the support strut, wherein FIG. 5 shows the section of the latter lying at a first end of the support strut, FIG. 7 is a perspective view of another embodiment of the support strut according to the invention with a base body and a connecting part arranged at a first end of the base body, which is held at a predetermined distance from the base body by way of a roving bundle, which is imbedded in a matrix material and whose ends lie in annular holes, wherein FIG. 7 depicts the section of the latter lying at a first end of the support strut, FIG. 8a is a side view of another embodiment of the support strut according to the invention with a base body, the depicted end section of which is designed as a connecting part, wherein FIG. 8 presents the section of the latter lying at a first end of the support strut, FIG. 8b is a sectional view of the embodiment of the support brace according to the invention depicted on FIG. 8, wherein FIG. 9 presents the section of the latter lying at a first end of the support strut.

DETAILED DESCRIPTION

Figure 1:
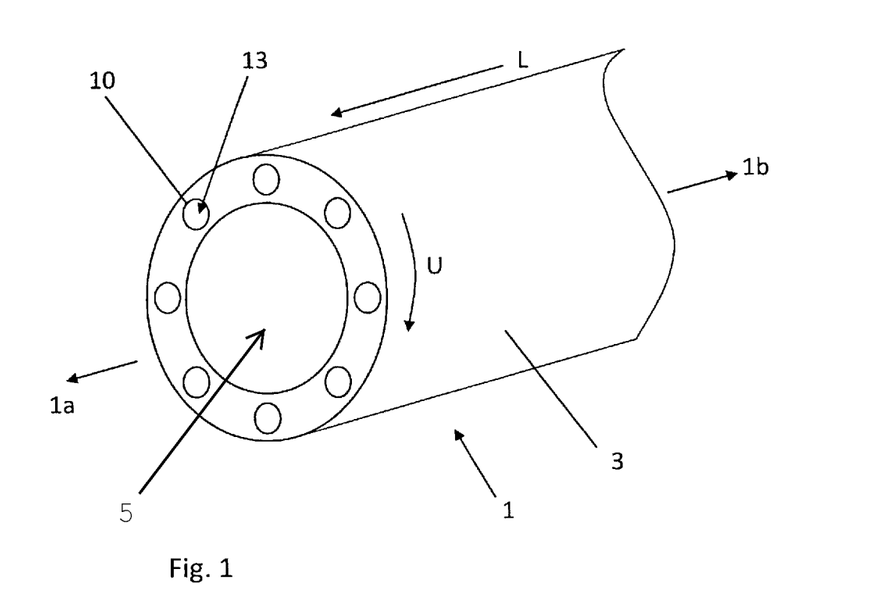
FIG. 1 is a perspective view of a central section of an embodiment of the support strut according to the invention, in which the cut reveals a cross section transverse to the longitudinal direction of the support strut.

FIG. 1 shows a perspective view of a central section of an embodiment of the support strut 1 according to the invention with a base body 3 extending in the longitudinal direction L of the support strut 1. The base body 3 has an annular cross section, which defines a cylindrical central hole 5 extending in the longitudinal direction L. In particular, the central hole 5 can be designed as a central through hole, which extends from a first end 1a in relation to the longitudinal direction L to a second end 1b of the support strut 1 lying opposite thereto. The central hole 5 can also be configured in such a way as to sectionally extend from the first end 1a or sectionally extend from the second end 1b, but not be designed as a single central hole 5 that passes continuously through the support strut 1 in its longitudinal direction L. Further, a central hole can respectively extend sectionally from the first end 1a, and another central hole can extend sectionally from the second end 1b.

The central hole 5 can be empty. Alternatively, the latter can also be filled with stabilizing material, such as a matrix material or a plastic. Alternatively or additionally, the wall of the central hole 5 can be provided with a reinforcing material. The latter can consist of at least one strip, which can extend strip-like on the wall and in particular along the longitudinal direction L as a layer applied to the wall. Alternatively, such a layer can sectionally or completely cover the wall of an annular ring, and in particular be applied to the latter for this purpose.

Alternatively or additionally, the central hole 5 can be designed as a continuous hole, and be provided for accommodating electrical cables.

Figure 2:
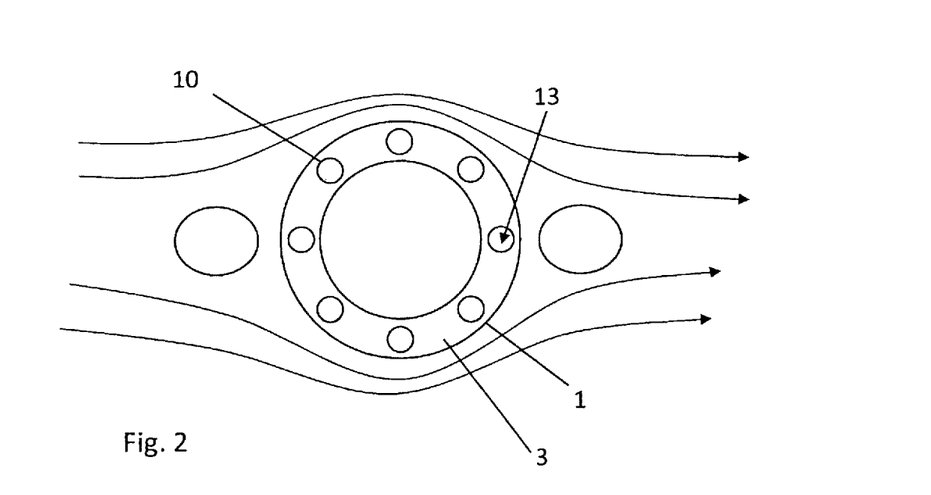
FIG. 2 is a cross sectional view of the support strut.

The base body 3 exhibits a plurality of annular holes 10, which are spaced apart from each other in the circumferential direction U of the annular cross section. The annular holes 10 can be partially or completely configured as through holes, which extend from the first end 1a and the second end 1b of the support strut 1. Alternatively or additionally, at least one annular hole 10 can also be designed in such a way that the latter sectionally extends from the first end or sectionally extends from the second end, i.e., is respectively not configured like an annular hole 10 extending continuously through the support strut 1 in its longitudinal direction L.

The support strut 1 exhibits roving bundles 13 comprised of plastic fibers, of which at least one lies in a respective one of a plurality of the annular holes 10, and one imbeds the matrix material filling the respective annular hole 10.

In this conjunction, "roving" is understood as a bundle of endless carbon filaments or electrically conducting cables, which can be untwisted and/or straight. The cables can here consist in particular of electrical, e.g., metallic, conductors jacketed by means of glass fibers. The electrically conducting individual filaments can be composed of carbon filaments and/or carbon fibers and/or metal alloys and/or glass fibers, e.g., with a metal coating. In particular, the rovings can also be comprised exclusively of fibers and in particular carbon fibers. The rovings can be furnished with or without matrix material. The rovings used according to the invention can here take the form of endless rovings, endless yarns, endless twists, endless strings, endless knits, endless wovens, endless cords or endless knitwear. Such endless rovings can be wound onto spools or drums for use in the method according to the invention, so that rovings can be removed from the latter for use in the method according to the invention.

In additional exemplary embodiments of the invention, a "roving" according to the invention can also be composed of several rovings, which in these instances are sub-rovings. In particular, the sub-rovings can here be braided or twisted with each other. In this conjunction, such a combination of a plurality of sub-rovings that do not have to run in a flat layer is understood as a "bundle of rovings".

The support strut 1 according to the invention is provided for use as a primary load-bearing structural component, which is mechanically integrated into an overall structure, and here in particular integrated between a first structural component and a second structural component in order to connect the latter and transfer forces and/or moments between the latter. Depending on the function of the support strut 1 in the respective application as a component between the first structural component and second structural component, the latter can be hinged to the first structural component and/or second structural component, i.e., depending on the application, the support strut can also be translatorily and/or rotationally fixed to the first structural component and/or second structural component. If it is hinged at least at one end to a structural component, the support strut 1 functions as a hinged strut.

In a support strut 1 according to the invention that functions as a component for absorbing primary loads of a structural component, and in particular as a primary load-bearing structural component, the technical effect of using roving bundles 13 is in particular that the support strut must provide a safeguard against structural instability as the result of buckling and Brazier loads. In addition, placing and imbedding roving bundles 13 in annular holes gives the support strut 1 the capacity to absorb multiple loads, thereby increasing the tolerance of the strut to damages.

In order to couple or attach at least one end 1a, 1b of the support strut according to the invention, the latter can be designed in a variety of ways.

Figure 4:
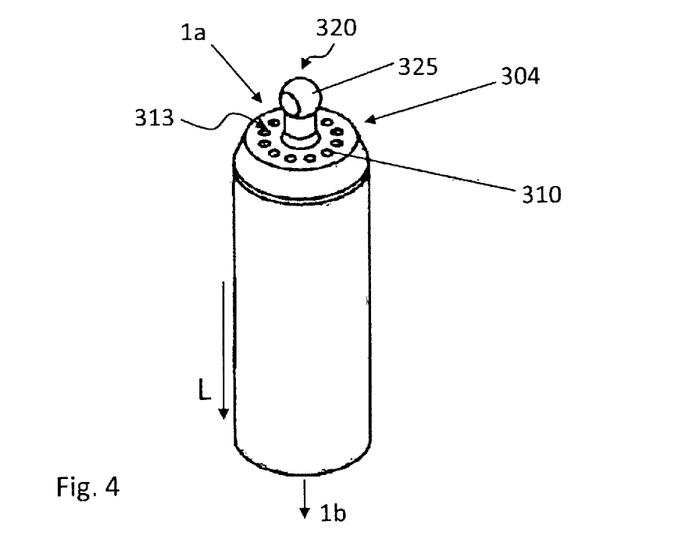
Figure 5:
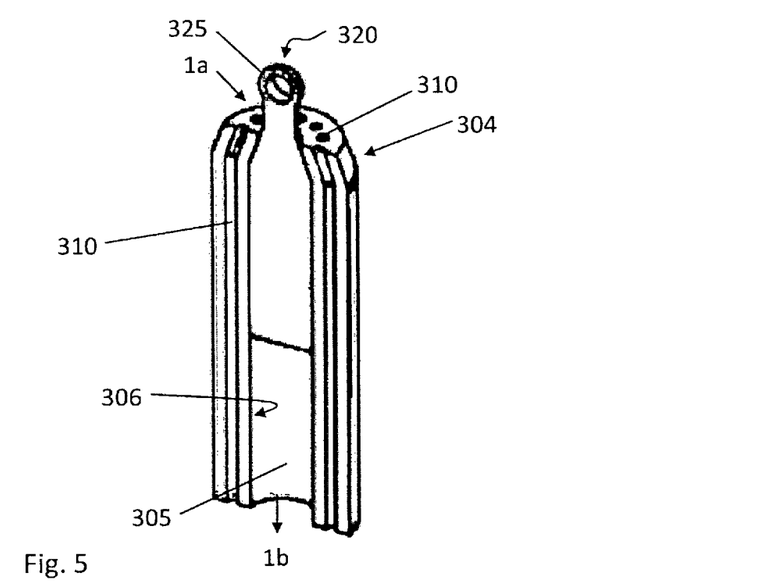
Figure 6:
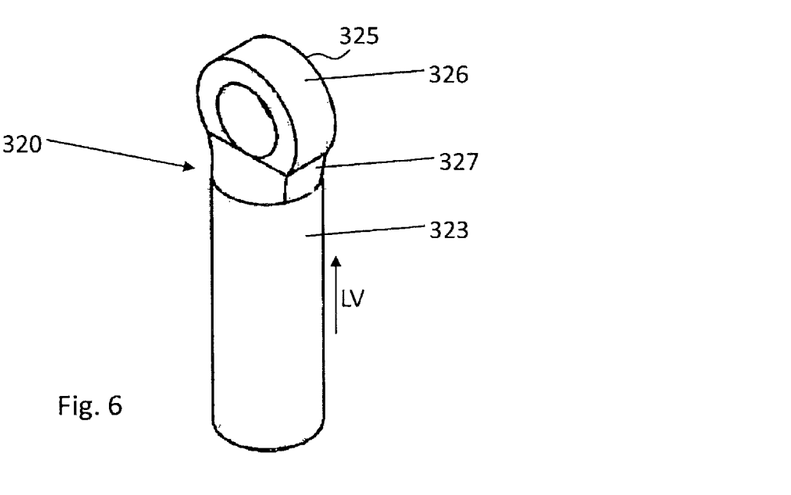
FIG. 6 is a perspective view of an embodiment of the hinged connecting body, which is integrated into the support strut according to the embodiment of the latter depicted on FIG. 3.

In the embodiment of the support strut 301 according to the invention with a base body 303 shown on FIGS. 4 to 6, the first end 1a and/or second end 1b has secured to it in the at least one cylindrical central hole a hinged connecting body 320 with a main body 323, which in particular can be cylindrical in design and exhibits the annular holes 310, an attachment piece 325 connected to the latter with a bearing receptacle 326 for holding a swivel joint and an adapter 327 lying between the base body 303 and the attachment piece, which is designed as an adapter piece that conically tapers toward the latter. The bearing receptacle 326 can be configured in such a way that it can incorporate a swivel joint that permits a rotational degree of freedom, or a ball joint.

Figure 3:
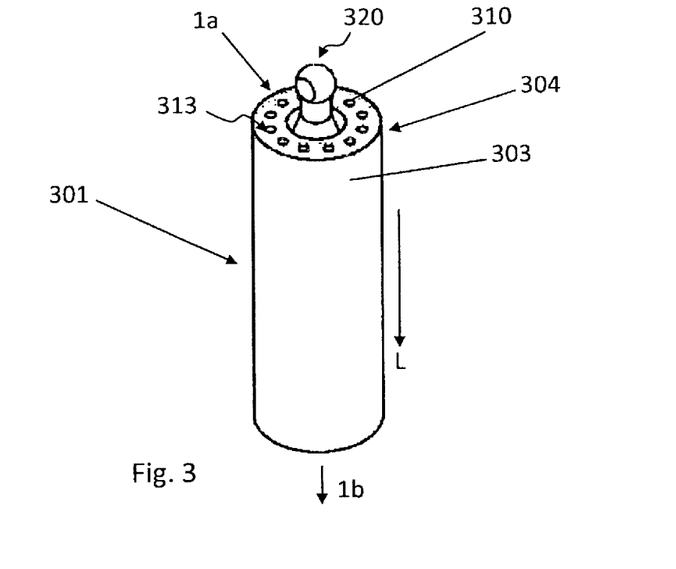

As a result, the diameter of the inner wall of the central through borehole 5 tapers toward the first end in such a way that the base body positively prevents the main body 323 from moving out of the first end of the base body 303 in its longitudinal direction L. FIG. 3 depicts a stage in the method for manufacturing the support strut 301 according to the invention in which the base body is in the state before its shape is adjusted to the shape of the hinged connecting body.

In one embodiment of the support strut according to the invention, the base body 303 consists of a fiber composite, with it here being provided in particular that the fiber constituents of the base body 303 are comprised of a thermoplastic material. This material can be used to convert the embodiment of the support strut 301 according to FIG. 4 from the initial state depicted on FIG. 3, in which the entire base body 303 exhibits a cylindrical shape with straight jacket lines along the longitudinal direction L, into the shape of the end product shown on FIGS. 4 and 5 by correspondingly heating the base body 303 composed of a thermoplastic material. One end section 304 of the base body 303 is here inwardly curved along the entire circumference transverse to the longitudinal direction L of the base body 303 in such a way that the inside wall 305 of the base body 303 in the area of section 304 abuts the section of the hinged connecting body 320 lying in this area, as may be gleaned from FIG. 5. In the process, the diameter of the inside wall 306 of the central through hole diminishes toward the first end 1b in such a way that the base body positively prevents the cylindrical main body from moving out of the first end of the base body in its longitudinal direction.

The base body for the connection shown on FIG. 3 can be made out of both thermoplastic and duroplastic. The procedural steps for molding can here vary: the end section is molded already before the matrix has been completely cross-linked when forming the base body with a matrix material comprised of duroplastic, while molding can also only take place after the base body has been completely fabricated in its cylindrical form through renewed melting and pressing when forming the base body with a matrix material comprised of thermoplastic.

In general, this approach is taken in processing an end section that lies at an end where a hinged connecting body 320 is also inserted in the base body 301. The latter is provided on the side where the support strut according to the invention is to be coupled or connected with another structural component via hinging. The hinged connecting body 320 is arranged on the first end 1a on FIGS. 3 to 5. Alternatively or additionally, a hinged connecting body 320 can also be arranged at the additional second end 1b lying opposite the first end in relation to the longitudinal direction L.

Figure 7:
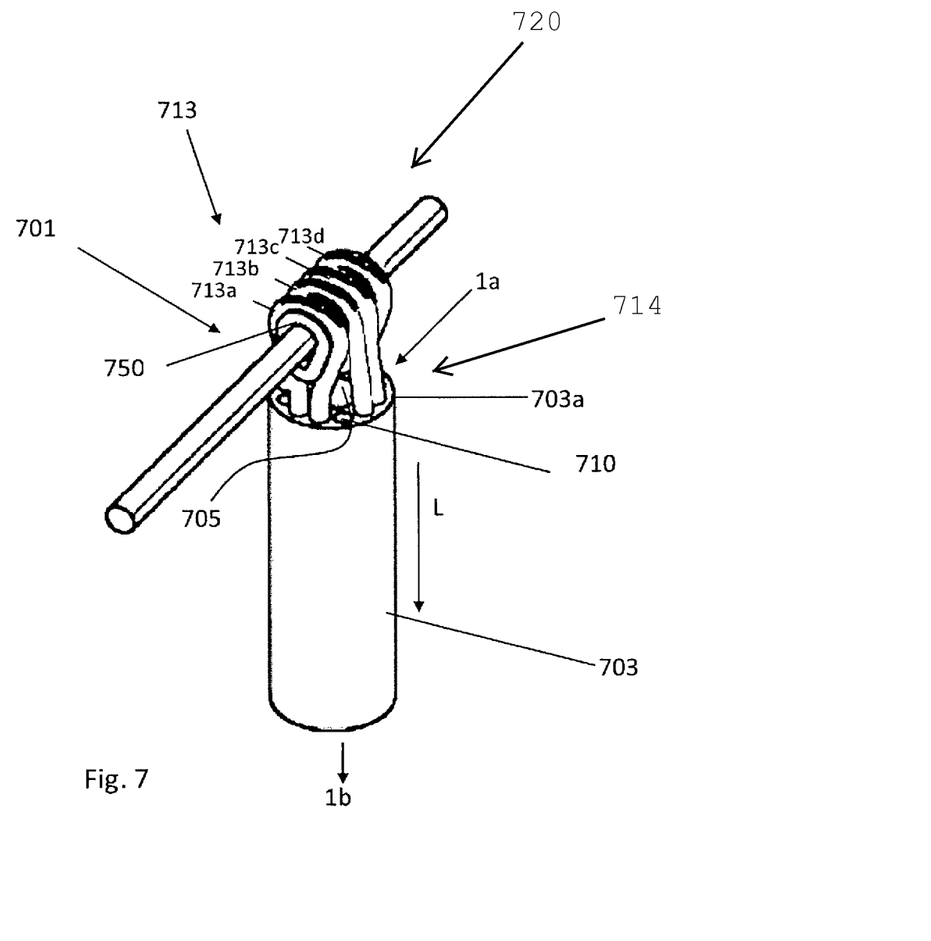

FIG. 7 shows another embodiment of the support strut according to the invention, which exhibits a hinged connecting body 720 comprised of roving bundles, which provides a hinged connection for pivoting the support strut 701 to a structural component. For purposes of diagrammatic illustration, FIG. 7 presents a connecting part 750 that accommodates an axis A, with which the support strut 701 can be coupled to another one to realize a rotational axis with a rotational degree of freedom.

This support strut 710 also exhibits a rod-shaped base body 703 extending in a longitudinal direction L and consisting of a fiber composite with an end section 703a that lies at a first end 1a of the base body 703 and has an annular cross section, which defines a cylindrical central hole 705 originating from the first end of the base body. The central hole 705 can be a completely continuous hole in the longitudinal direction L of the base body 703, meaning a through hole or a through borehole.

Alternatively, the central hole 705 can be designed as a central hole that extends only sectionally in the longitudinal direction L at one end 1a. A central hole extending only sectionally in the longitudinal direction L can here be formed on the support strut 701 at the second end 1b as well. The embodiment of the support strut 701 according to the invention depicted on FIG. 7 also exhibits annular holes 710 that are spaced apart relative to each other in the circumferential direction of the annular cross section and originate from the first end 1a along the longitudinal direction L in the base body 703, which can be completely or partially designed as annular through openings, or as annular holes sectionally extending from a respective end 1a, 1b.

In addition, the embodiment of the support strut 701 according to the invention exhibits at least one roving bundle 713. At least one roving bundle 713 here lies in a respective one of the plurality of annular holes 710, and is imbedded in a matrix material that fills up the respective annular hole 710. In the embodiment of the support strut 701 according to FIG. 7, several roving bundles 713a, 713b, 713c, 713d are arranged in this way. The latter are here secured to the base body 703 in such a way that their respective end sections lie in a respective one of two annular holes 710, wherein each end section of the roving bundles in conjunction with the matrix material respectively enveloping the latter lies in a respective annular hole, meaning is imbedded in the matrix material located in the latter. The matrix material here fills up the respective annular hole, causing the respective roving bundle to be secured in the respective annular hole. In addition, the two end sections of a respective roving bundle 713a, 713b, 713c, 713d can lie in annular holes, which viewed from above lie opposite each other in relation to the connecting part 750. As a result, an intermediate section 714 lying between the end sections situated in the respective annular holes 710 extends from the respective annular holes 710 over a surface of the connecting part 750, which is arranged on the opposite side of the base body of the hinged strut 701. This respective intermediate section 714 of the respective roving bundle 713a, 713b, 713c, 713d can be imbedded in a matrix material, and enveloped by a matrix material. This matrix material in conjunction with the connecting part 750, which also can consist of a fiber composite material, can in particular form a uniform component with the matrix material of the latter in this case. In particular, it can be provided that the intermediate sections 714 of the roving bundles 713a, 713b, 713c, 713d with the matrix material enveloping the latter in conjunction with the matrix material of the base body 703 together form a connecting piece, which is uniform and/or integral in particular with respect to the material, and holds the connecting part 750 to the base body.

Figure 8A:
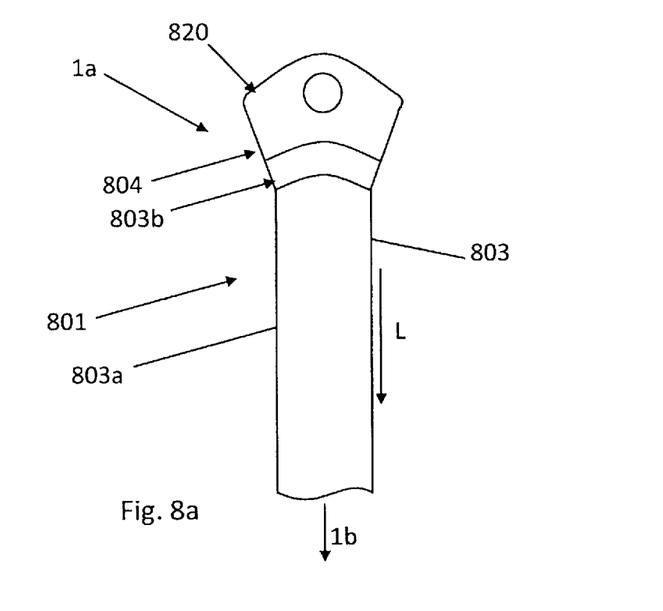
Figure 8B:
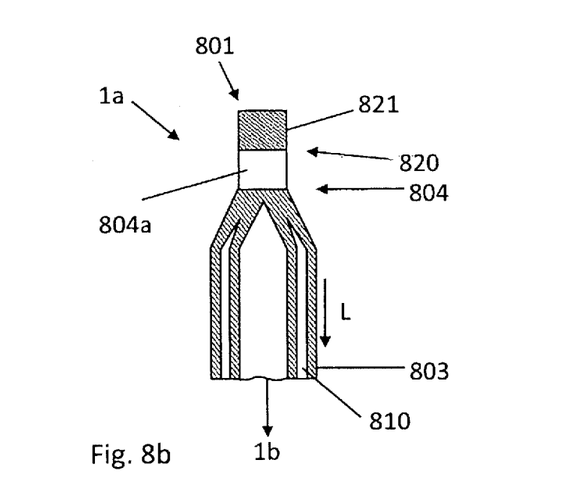

In another embodiment of the support strut according to the invention, which is labeled with reference number 801 on the figures, the hinged connecting body 820 is made out of an end section 804 of the base body 803 by compressing the respective end section 804, so that the end section 804 forms an attachment piece 821. The end section 804 lying at one or both respective ends 1a, 1b can here be compressed in this way, while the central or residual section 803a of the base body 803 remains unmolded. Compressing the respective end section 804 causes the cross section of the base body 803 to taper in a transitional region 803b while retaining the essential cross sectional shape relative to an outside attachment section 804, in which in particular the annular holes 810 have been pressed together and dissolved, meaning destroyed, so that the attachment section 804 is made out of a uniform material. In one embodiment, a borehole 804a that can be designed as a hinged receptacle is incorporated into the attachment section 804 in this state, so as to accommodate a bearing bushing or an axis or an attachment piece of an additional structural component.

The base body for the connection shown in FIGS. 8a-8b can be made out of both thermoplastic and duroplastic. The procedural steps for molding can here vary: the end section is molded already before the matrix has been completely cross-linked when forming the base body with a matrix material comprised of duroplastic, while molding can also only take place after the base body has been completely fabricated in its cylindrical form through renewed melting and pressing when forming the base body with a matrix material comprised of thermoplastic.

Figure 9:
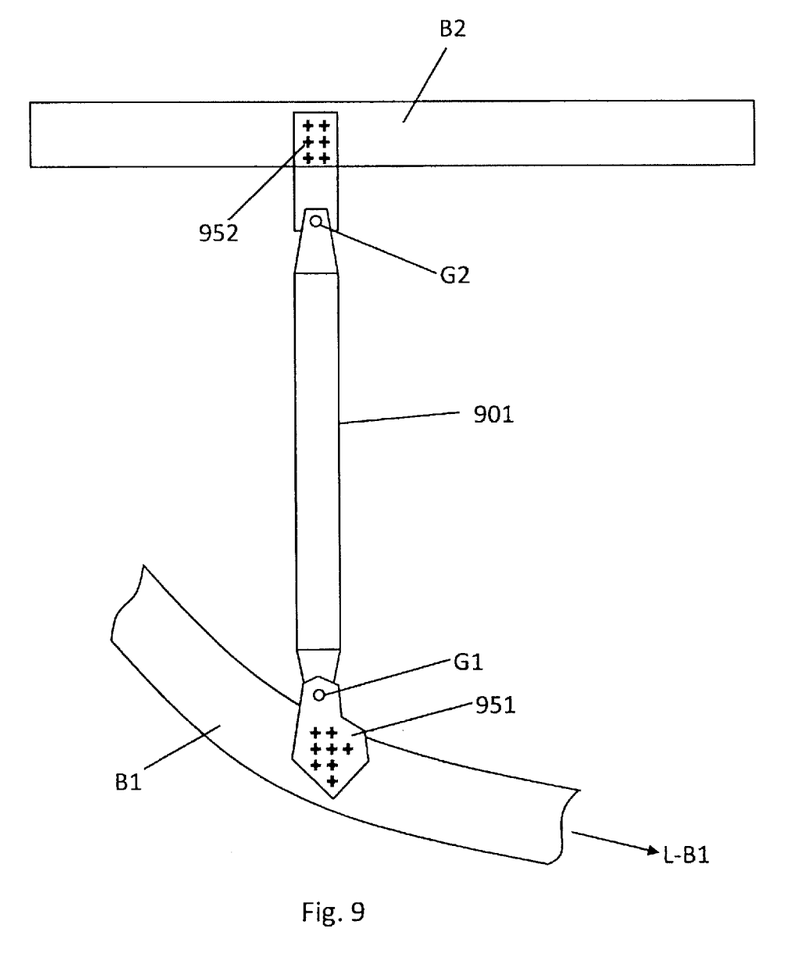
FIG. 9 is the embodiment of the support strut according to the invention depicted on FIGS. 8a and 8b in a state integrated between two primary structural components.

FIG. 9 shows an example for the application of the support strut according to the invention, which is labeled with reference number 901 on FIG. 9. In particular according to the special shape on FIG. 4 as well as FIGS. 8a and 8b, the support strut can be designed as the corresponding hinged connecting bodies or attachment pieces to form a respective hinged joint G1, G2 with a respective additional structural component B1 or B2. FIG. 9 shows an exemplary application for the fuselage of an aircraft: the first structural component B1 is a rib shaped like a bow in its longitudinal or circumferential direction L-B1. The rib is composed of a monolithic material so that it can absorb large forces. Several ribs B1 bearing a fuselage outer skin along with several cross beams B2 are arranged spaced apart one behind the other viewed perpendicular to the sheet plane of FIG. 9 or in the longitudinal direction of the aircraft. In particular, the cross beams can be provided for accommodating floor plates to make the floor of a passenger cabin of an aircraft. The support strut can be coupled to the structural components B1 or B2 by means of a metal mounting 951 or 952 secured to the structural components B1 or B2.

Each or a plurality of such ribs B1 are connected with a second structural component B2 in the form of a cross beam made out of monolithic material via several support struts 901 by means of hinged joints G1, G2, so that each hinged joint G1, G2 provides at least a rotational degree of freedom to take into account the deflection of structural components B1, B2. One or several of the hinged joints can also consist of a ball joint. In particular, the at least one support strut can be designed as the embodiment shown on FIG. 7 or 8a, 8b.

In another exemplary embodiment, the support strut according to the invention can be designed as a support strut in a guiding system of a high-lift system, with which a high-lit flap and in particular trailing edge flap K of an aircraft can be moved between a retracted and extended position.

Figure 10:
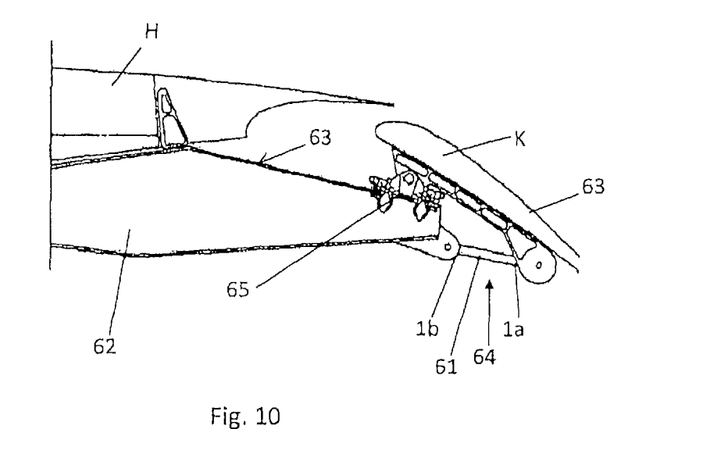
FIG. 10 is a diagrammatic sectional view of a guiding mechanism of a high-lift system for moving a trailing edge flap, which exhibits track kinematics and incorporates an embodiment of the support strut according to the invention as a rear hinged strut.

FIG. 10 shows a guiding mechanism 60 for adjusting a trailing edge flap K exhibiting a guiding path 63 arranged or formed on a carrier section 61, on which a carriage 65 can be moved. The carrier section 62 is secured to the main wing (not shown). The trailing edge flap K is pivoted to the carriage 65. An output element of an actuator (not shown) powered by a drive unit is coupled to the carriage 65 or the flap K, so as to move the latter to adjust the flap K. In order to guide the state of adjustment, i.e., the position of the flap K, as a function of the adjustment positions of the latter on the guiding path 63, the rear area 66 of the flap K is hinged to one end 1a of a support strut 61 according to the invention. Hence, the support strut 61 and carriage 65 form a supporting device for the regulating flap K. In particular, the end 1b lying opposite for this purpose is designed according to one of the embodiments mentioned herein.

Figure 11:
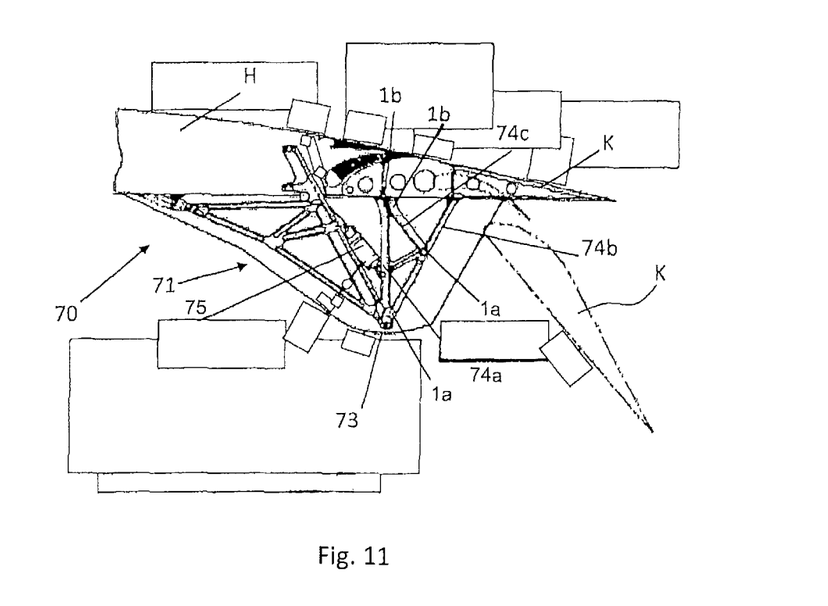
FIG. 11 is a diagrammatic sectional view of a guiding mechanism of a high-lift system for moving a trailing edge flap, which exhibits lever kinematics and incorporates an embodiment of the support strut according to the invention as a rear hinged strut.

FIG. 11 depicts a guiding mechanism 70 for adjusting a regulating flap, and in particular a trailing edge flap K, which exhibits a hinged joint 73 that is arranged on a carrier section or carrier structure 71, and has pivoted to it a flap support structure 74. A regulating flap K, in particular a trailing edge flap, is mounted or secured to the flap support structure 74. The support structure 71 is secured to the main wing H. An output element of an actuator 50 powered by a drive unit is coupled to the support structure 74 (as shown) or flap K, so as to move the latter for adjusting the flap K. To guide the position of the flap K as a function of the position of the corresponding output element of the actuator 75, the rotational position of the flap support structure 74 is altered. In order to guide the flap K in a predetermined manner, the support structure can consist of several support struts 74a, 74b, 74c as shown, on which the flap K is held. Two support struts 74a, 74b are used in the embodiment depicted on FIG. 11, the first end of which is coupled to the hinged joint 73, while the second end 1b is coupled to the flap K, spaced apart in the flap depth direction. In particular, the ends 1a and 1b are designed according to one of the embodiments cited herein, so as to form the hinged joint 73 on the one hand, and provide a hinged attachment of the support struts 74a, 74b to the regulating flap K on the other. The at least one hinged joint for establishing a hinged attachment of the support struts 74a, 74b to the regulating flap K can be configured in particular in such a way that the rotational axis runs transverse to the spanning direction of the flap K, so as to offset deflections of the flap K. Alternatively, one or several support struts can be secured to the flap in a torque-proof manner. At such ends of the support struts, the latter do not exhibit a hinged connecting body as depicted herein, but are rather attached or connected in a torque-proof manner with an end piece on the respective other support strut. In particular, an additional support strut 74c can be secured in a torque-proof manner to a support strut 74b or several support struts of arrangement 74, so as to impart sufficient rigidity to the arrangement 74. One or more support struts of arrangement 74 can be designed according to an embodiment of the invention.

The invention claimed is:

1. A support strut for use as a primary load-bearing structural component for hinged coupling of at least one additional primary load-bearing structural component for an aircraft, wherein the support strut comprises:
   a rod-shaped base body extending in a longitudinal direction and comprising a fiber composite, with an end section lying at a first end of the base body and at least sectionally exhibiting an annular cross section along the longitudinal direction, which defines a first central hole originating from the first end of the base body, and with first annular holes spaced apart relative to each other in a circumferential direction of the annular cross section and originating from the first end of the base body as well as running along the longitudinal direction in the base body;
   first roving bundles, of which at least one lies in a respective one of the first annular holes and is imbedded in a matrix material that fills up a respective one of the first annular holes; and
   a first connecting part that is held at the first end of the base body at a predetermined distance from the base body by the first roving bundles, which are imbedded in the matrix material, where a first end of each first roving bundle lies in one of the first annular holes, and a second end of each first roving bundle lies in another one of the first annular holes;
   wherein the first roving bundles are configured to be wound around the first connecting part between the first end and the second end of each of the first roving bundles.

2. The support strut according to claim 1, further comprising:
   a cylindrical second central hole and several second annular holes spaced apart from each other in the circumferential direction of the annular cross section and originating from a second end of the base body, as well as running along the longitudinal direction in the base body, the second end lying opposite the first end;
   second roving bundles, of which at least one of the second roving bundles lies in a respective one of the second annular holes formed at the second end, and is imbedded in a matrix material that fills up a respective one of the second annular holes; and
   a second connecting part that is arranged at the second end of the base body and held at a predetermined distance from the base body by at least one of the second roving bundles, which is imbedded in a matrix material, where a first end of each second roving bundle lies in one of the second annular holes, and a second end of each second roving bundle lies in another one of the second annular holes, wherein the second roving bundles are configured to be wound around the second connecting part between the first end and the second end of each of the second roving bundles.

3. The support strut according to claim 1, wherein the at least one first roving bundle comprises a carbon fiber-reinforced thermoplastic material or duroplastic material.

4. The support strut according to claim 1, wherein the matrix material comprises a duroplastic material, which encompasses reinforcing fibers and comprises glass fibers.

5. The support strut according to claim 2, wherein the cylindrical second central hole is a same as the first central hole and/or the several second annular holes are the same as the first annular holes.

6. The support strut according to claim 2, wherein the cylindrical second central hole is different than the first central hole and/or the several second annular holes are different than the first annular holes.

\* \* \* \* \*